W. D. INSKO.
FORCING BED.
APPLICATION FILED JULY 6, 1918.

1,297,853.

Patented Mar. 18, 1919.

Witnesses
R. A. Thomas.
J. W. Gainer

Inventor
Walter D. Insko

By Victor J. Evans
Attorney

UNITED STATES PATENT OFFICE.

WALTER D. INSKO, OF ANSELMO, NEBRASKA.

FORCING-BED.

1,297,853. Specification of Letters Patent. Patented Mar. 18, 1919.

Application filed July 6, 1918. Serial No. 243,545.

*To all whom it may concern:*

Be it known that I, WALTER D. INSKO, a citizen of the United States, residing at Anselmo, in the county of Custer and State of Nebraska, have invented new and useful Improvements in Forcing-Beds, of which the following is a specification.

This invention is an improved forcing bed for forcing or raising plants and for other like purposes, the object of the invention being to provide an improved forcing bed of this kind which is simple in construction and which utilizes the heat from a lamp or other heating medium in starting and forcing the plants.

With the above and other objects in view, the invention consists in the construction, combination and arrangement of devices hereinafter described and claimed.

Figure 1:
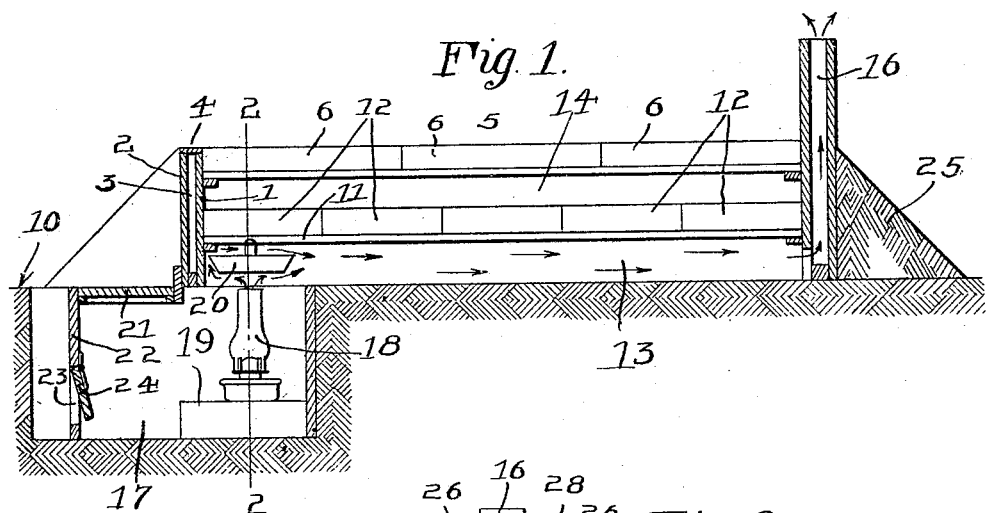
Figure 1 is a vertical longitudinal sectional view of a forcing bed constructed in accordance with my invention.
Figure 2:
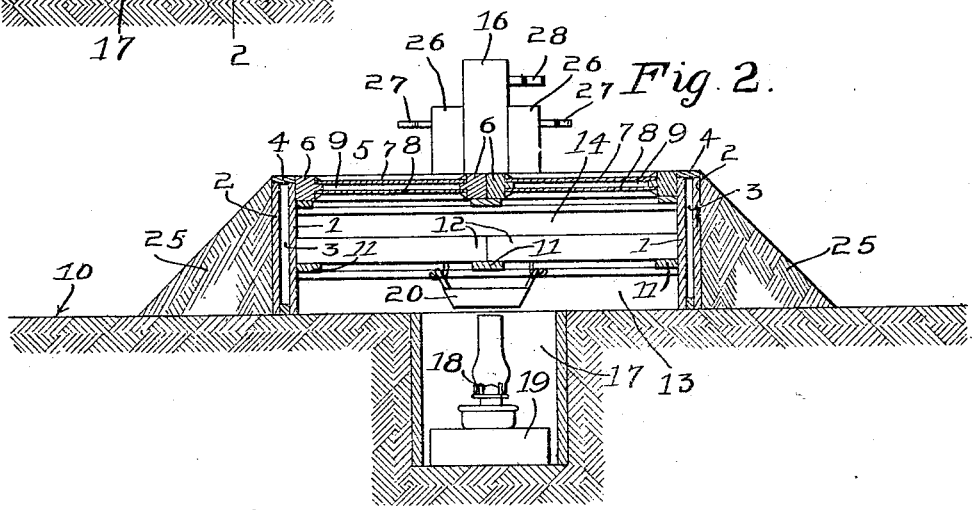
Fig. 2 is a vertical transverse sectional view of the same.
Figure 3:
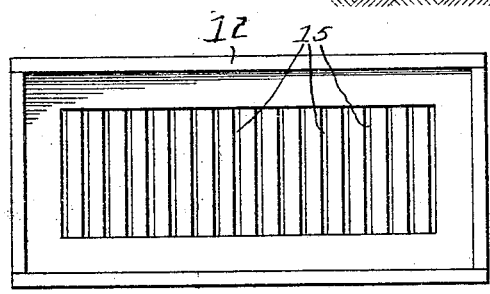
Fig. 3 is a detail plan of the trays.

The forcing bed comprises end walls and side walls each of which has an inner wall 1 and an outer wall 2 spaced therefrom, so that dead air spaces 2 are formed between the inner and outer walls and which extend entirely around the forcing bed. The said dead air spaces are covered by boards or strips 4.

The cover 5 of the forcing bed comprises a suitable frame 6 and cloths or glass panes, 7, 8 which are spaced one above the other as shown so that the air space 9 is formed therebetween and which forms a non-conductor of heat. The bed is arranged on the level 10 of the ground with the lower edges of its side and end walls bearing thereon and the side walls of the bed are provided on their inner sides with suitable supports 11 which are spaced a suitable distance above the ground and which serve to support a series of removable trays 12 which trays are filled with earth in which the plants are grown. This arrangement provides an air chamber 13 below the trays and also provides a light and air chamber 14. The trays have perforated bottoms 15, which in practice, are usually constructed of laths or light wooden strips which are secured at a distance of about one-half of an inch apart. At the rear end of the forcing bed is an upwardly extending flue 16. A pit 17 is dug below the front end of the forcing bed and is provided with a lamp 18 or other heating device and which is here shown as placed on a cooling tank 19. A water tank 20 is arranged above the heater 18 and is here shown as suspended from some of the trays. This tank is supplied with water for evaporation and to supply moisture below the trays and prevent the earth in the trays from becoming too dry. That part of the pit which extends beyond the front of the forcing bed is provided with a trap door 21 to cover the same and the front wall 22 of the pit which is preferably made of board or cement is provided with a draft opening 23 and a door 24 to close the same.

Earth or manure is banked against the walls of the forcing bed as at 25 to exclude cold and the forcing bed is provided at the rear end and on opposite sides of the flue 16 with ventilator flues 26 each of which is provided with a damper or valve 27 so that said ventilating flues may be closed entirely or partially to any extent as may be required.

A damper 28 is also provided near the upper end of the flue 16.

It will be understood that the heated air and products of combustion from the heater or lamp pass through the space or chamber 13 below the trays and up through the flue 16 so that all of the trays are heated and kept at the desired temperature.

My improved forcing bed may be made of any suitable material and may be of any suitable dimensions and may be either a permanent or a portable structure as may be desired.

Having thus described my invention, I claim:—

A forcing bed comprising double end and side walls having a bank of clay or the like therearound excepting at the center of one end thereof, a pit at the last mentioned end communicating with the bed and projecting beyond the bank, a transverse wall in the pit, a door regulated draft opening therein, a trap door between the top of the wall and the end of the bed, a heater in the pit, reticulated trays arranged horizontally in the bed, a heat outlet flue at the end of the bed opposite that provided with the pit, a damper controlling the same, ventilating flues to the opposite sides of the heat outlet flue also communicating with the bed, and regulating dampers therefor.

In testimony whereof I affix my signature.

WALTER D. INSKO.